(12) United States Patent
Pakpum et al.

(10) Patent No.: US 8,343,363 B1
(45) Date of Patent: Jan. 1, 2013

(54) METHOD AND SYSTEM FOR FABRICATING A CAVITY IN A SUBSTRATE OF A MAGNETIC RECORDING HEAD

(75) Inventors: Chupong Pakpum, Pathum Thani (TH); Laddawan Supadee, Bangpa-In (TH)

(73) Assignee: Western Digital (Fremont), LLC, Fremont, CA (US)

( * ) Notice: Subject to any disclaimer, the term of this patent is extended or adjusted under 35 U.S.C. 154(b) by 267 days.

(21) Appl. No.: 12/721,218

(22) Filed: Mar. 10, 2010

(51) Int. Cl.
B44C 1/22 (2006.01)
(52) U.S. Cl. ............... 216/22; 216/66; 216/75; 216/77
(58) Field of Classification Search .............. 216/22, 216/66, 75, 77
See application file for complete search history.

(56) References Cited

U.S. PATENT DOCUMENTS

| | | | |
|---|---|---|---|
| 6,001,268 | A | 12/1999 | Nguyen et al. |
| 6,027,660 | A | 2/2000 | Hsiao et al. |
| 6,198,601 | B1 | 3/2001 | Hira et al. |
| 6,238,582 | B1 | 5/2001 | Williams et al. |
| 6,838,389 | B2 | 1/2005 | Williams et al. |
| 7,329,362 | B2 | 2/2008 | Cyrille et al. |
| 2006/0232885 | A1* | 10/2006 | Heng et al. ............ 360/235.7 |
| 2007/0014050 | A1 | 1/2007 | Yasui et al. |
| 2007/0081279 | A1 | 4/2007 | Hong et al. |
| 2007/0253117 | A1* | 11/2007 | Takei et al. ................ 360/313 |
| 2010/0079895 | A1* | 4/2010 | Takayama et al. ............ 360/59 |

OTHER PUBLICATIONS

Nobuto Fukushima, "High-Rate and Smooth Surface Etching of Al2O3-TiC Employing Inductively Coupled Plasma (ICP)", Jpn. J. Appl. Phys. vol. 35 (1996), pp. 2512-2515, Part 1, No. 4B, Apr. 1996.
Alonggot Limcharoen, et al., "Wall Angle Control of Reactive Ion Etched Features on a Silicon Substrate," IEEE International Nanoelectronics Conference 2010 (INEC 2010), 2 pages.
J. Bhardwaj, et al., "High-Throughput Inductively Coupled Plasma Production Platform for Etching Air-Bearing Surfaces on GMR Read/Write Heads", in Datatech, 1 ed., pp. 131-135.
Mingsheng Zhang et al., "Dry Etching of AlTiC with CF4 and H2 for Slider Fabrication", IEEE Transactions on Magnetics, vol. 39, No. 5, Sep. 2003, pp. 2486-2488.

* cited by examiner

Primary Examiner — Binh X Tran

(57) ABSTRACT

A method for fabricating an air-bearing surface (ABS) in a substrate having a surface is described. The substrate is for a magnetic recording head. The method includes providing a mask on the surface of substrate. The mask has an edge adjacent to a portion of the substrate exposed by the mask. The method also includes forming a taper in the portion of the substrate adjacent to the edge. The taper has an angle from the surface of the substrate of at least thirty degrees and not more than seventy degrees. The method also includes performing a reactive ion etching (RIE) to remove the portion of the substrate to form a cavity in the substrate. The angle of the taper is configured to substantially eliminated redeposition from the RIE on the edge.

11 Claims, 6 Drawing Sheets

US 8,343,363 B1

METHOD AND SYSTEM FOR FABRICATING A CAVITY IN A SUBSTRATE OF A MAGNETIC RECORDING HEAD

BACKGROUND

FIG. 1 is a flow chart depicting a conventional method 10 for fabricating a portion of a conventional magnetic recording head. More specifically, the conventional method 10 is used for cavity in the portion of the substrate forming the air-bearing surface (ABS). FIGS. 2-4 depict a portion of the conventional magnetic recording head 50 during fabrication. A photoresist layer is provided on the substrate, via step 12. Using photolithography, a pattern is transferred to the photoresist layer, forming a conventional a photoresist mask, via step 14. The mask exposes portions of the substrate, but covers other parts of the substrate. FIG. 2 depicts the conventional head 50 including the substrate 52. A mask 54 has been formed. A portion 53 of the substrate 52 is exposed by the mask 54. With the mask in place, a conventional reactive ion etch (RIE) is performed to form a trench in the substrate, via step 16. FIG. 3 depicts the conventional magnetic recording head 50 during the RIE. During the RIE, part of the substrate in the exposed region 53 is removed. Thus, substrate 52' is shown in FIG. 3. A conventional cavity 58 has been formed using the RIE. A photoresist strip is performed, via step 18. FIG. 4 depicts the conventional magnetic recording head 50 after step 50 has been completed. Thus, the mask 54 has been removed.

Although the conventional method 10 may provide the conventional cavity 58' in the substrate 52", the sidewalls of the conventional cavity 58' may have a shallow angle. As can be seen in FIG. 4, the cavity sidewalls make an angle θ with the top surface. Typically, this angle is twenty to forty degrees for a twenty to thirty micro-inch depth cavity 58'. In general, the angle θ decreases with an increase in the depth of the conventional cavity 58'. The shallow angle θ may be the result of redeposition 56, shown in FIG. 3. Redeposition 56 results from some of the material of the substrate that is removed being deposited back onto the sidewalls of the photoresist mask 54 and the sidewalls of the cavity 58, as shown in FIG. 3. The shallow angle θ may result in an increase in variations of the fly height of the ABS. Such an increase may make the conventional magnetic recording head 50 more likely to accidentally contact the disk (not shown), which is undesirable. Redeposition 56 may also result in oxidation of portions of the magnetic recording head, such as the write pole. Such oxidation may adversely affect performance and reliability of the magnetic recording head. Accordingly, what is needed is an improved method for fabricating a magnetic recording head.

SUMMARY

A method for fabricating an air-bearing surface (ABS) in a substrate having a surface is described. The substrate is for a magnetic recording head. The method includes providing a mask on the surface of substrate. The mask has an edge adjacent to a portion of the substrate exposed by the mask. The method also includes forming a taper in the portion of the substrate adjacent to the edge. The taper has an angle from the surface of the substrate of at least thirty degrees and not more than seventy degrees. The method also includes performing a reactive ion etching (RIE) to remove the portion of the substrate to form a cavity in the substrate. The angle of the taper is configured to substantially eliminated redeposition from the RIE on the edge.

DETAILED DESCRIPTION OF THE PREFERRED EMBODIMENTS

Figure 1:
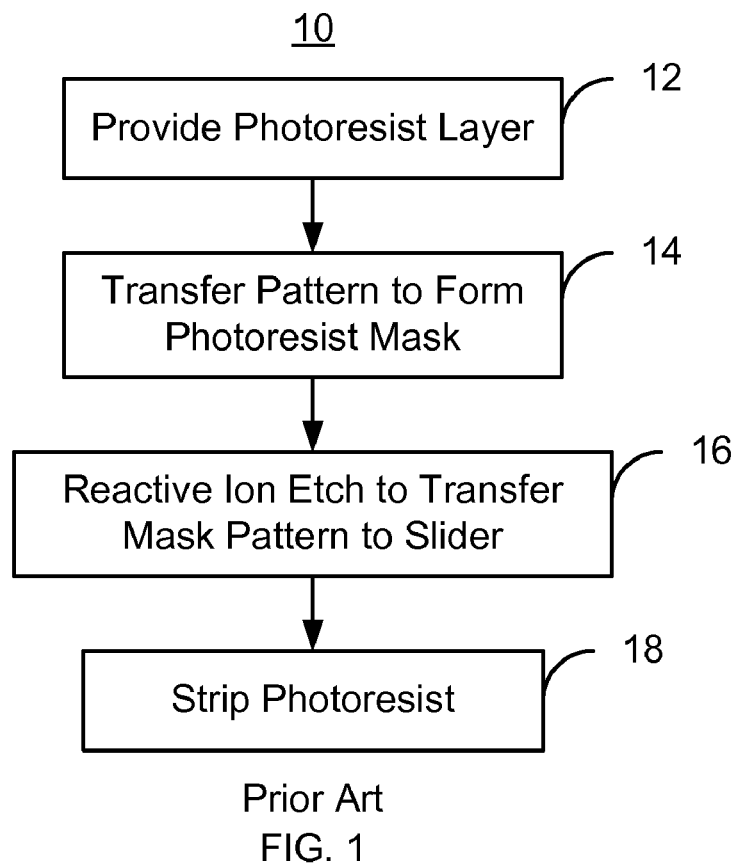
FIG. 1 is a flow chart depicting a conventional method for fabricating a conventional magnetic recording head.
Figure 2:
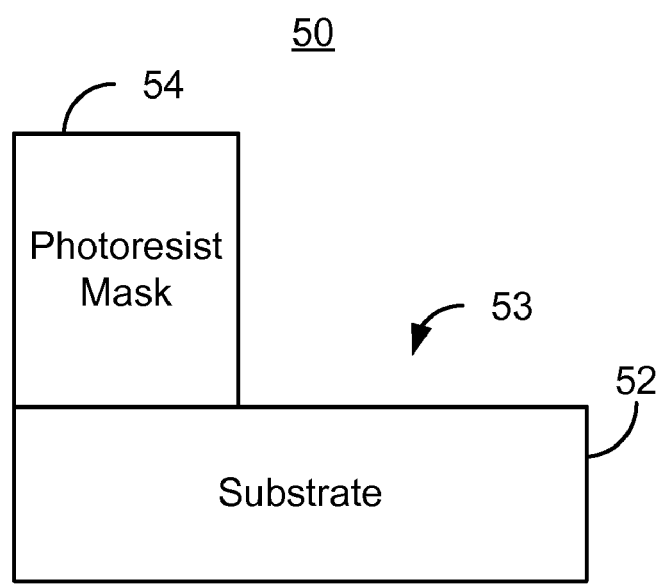
FIGS. 2-4 are diagrams depicting a conventional magnetic recording head during fabrication.
Figure 3:
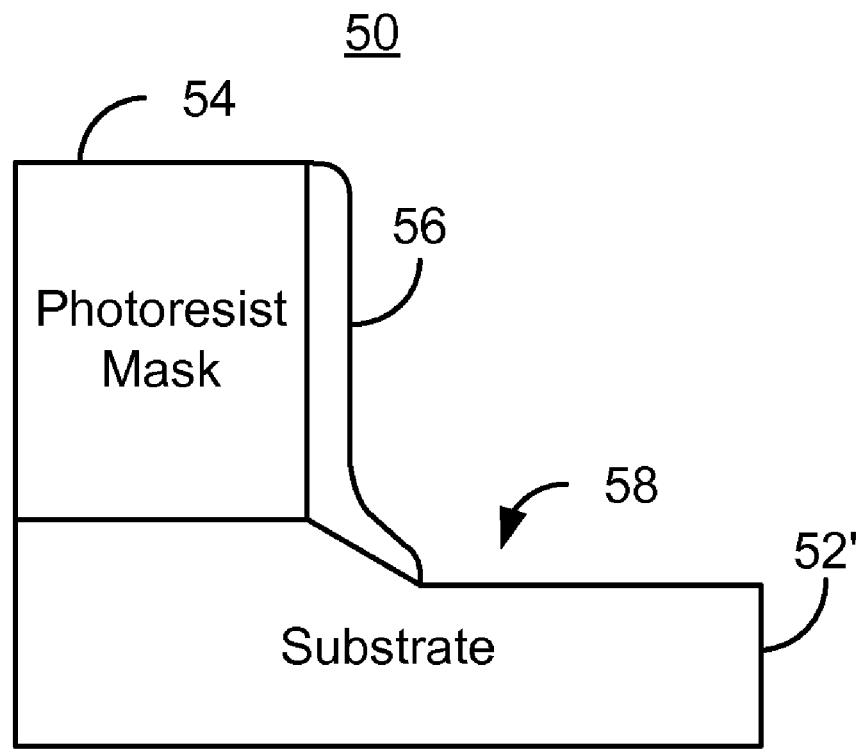
Figure 4:
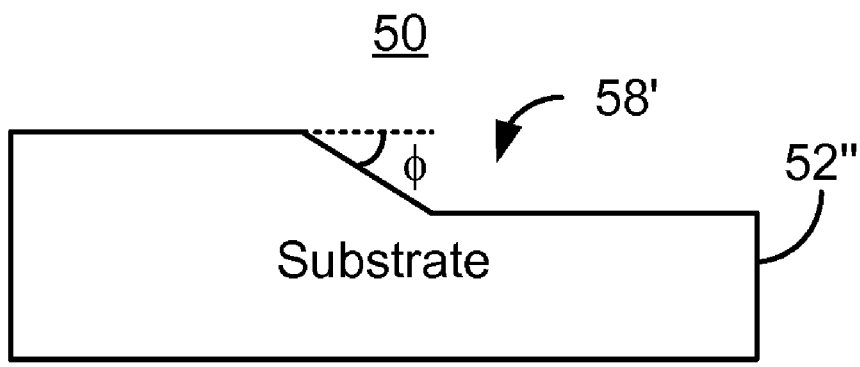
Figure 5:
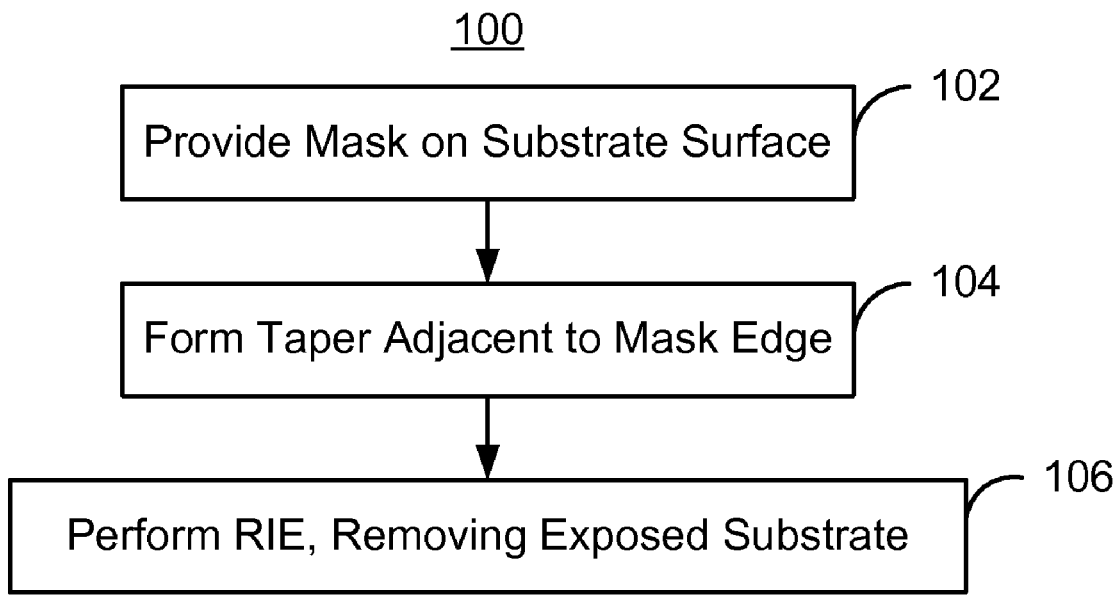
FIG. 5 is a flow chart depicting an exemplary embodiment of a method for fabricating a magnetic recording head.

FIG. 5 is a flow chart depicting an exemplary embodiment of a method 100 for fabricating a magnetic recording head. For simplicity, some steps may be omitted and/or combined. The method 100 also may commence after formation of other portions of the magnetic recording head. The method 100 is also described in the context of providing a magnetic recording head. However, the method 100 may be used to fabricate multiple magnetic recording heads at substantially the same time. The method 100 is used in fabricating the ABS of the magnetic recording head. More specifically, the method 100 may be used in forming a cavity for the ABS.

A mask is provided on the surface of the substrate of the magnetic recording head, via step 102. In some embodiments, the mask is a photoresist mask. Thus, step 102 may include depositing a layer of photoresist and transferring a pattern to the photoresist layer. The mask exposes a portion of the substrate. Thus, the mask has an edge, or sidewall, adjacent to this exposed portion of the substrate.

A taper is formed in the portion of the substrate adjacent to the edge of the mask, via step 104. In some embodiments, the taper adjoins the edge. The taper forms an angle from the surface of the substrate of at least thirty degrees and not more than seventy degrees. In some embodiments, this taper angle is at least forty-five degrees and not more than sixty degrees. In some embodiments, the taper is formed by performing an ion beam etch at an etch angle from normal to the surface of the substrate. This etch angle is at least twenty degrees and not more than forty-five degrees. Thus, a taper may be formed adjacent to the mask.

An RIE is performed, via step 106. The RIE may, for example, utilize a fluorine-based plasma. In an alternate embodiment, the RIE might use a chlorine-based plasma. The RIE removes the exposed portion of the substrate, adjacent to the edge of the mask. Thus a cavity is formed in the substrate. The angle of the taper formed in step 104 is configured such that redeposition from the RIE on the edge of the mask is substantially eliminated. For example, etch products of a chlorine-based chemistry of an AlTiC substrate may include $Al_wCl_x$ and $Ti_yCl_z$. Similarly, etch products of a fluorine-based chemistry of an AlTiC substrate might include $Al_uF_y$. However, less of such residue accumulates on the edges of the mask. Stated differently, the taper may allow for self-cleaning of the sidewalls of the mask. Once the RIE is performed, the mask may be stripped and fabrication of the magnetic recording head continued.

Figure 6:
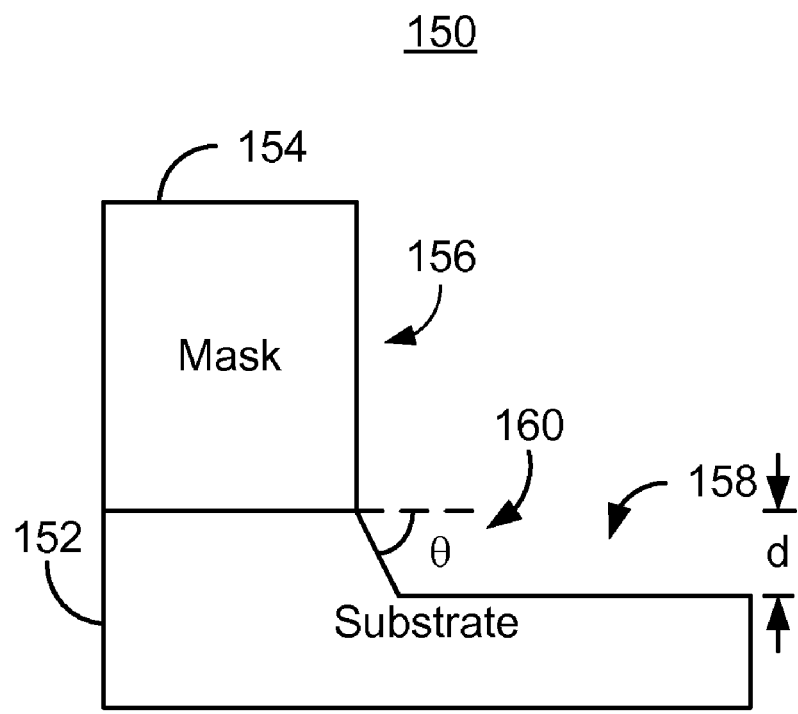
FIG. 6 is a diagram depicting an exemplary embodiment of a magnetic recording head.

FIG. 6 is a diagram depicting an exemplary embodiment of a magnetic recording head 150 after step 106 of the method 100 has been performed. For clarity, FIG. 6 is not to scale. The head 150 shown includes a substrate 152, or slider as well as a mask 154. Magnetic recording transducer (not shown) and/or a read transducer (not shown) may also be formed on the substrate. Multiple read and/or write transducers may be formed on the substrate 152. In some embodiments, the substrate 152 may include AlTiC. However, in other embodiments, the substrate 152 may include other materials such as a ceramic. The mask 154 provided in step 152 is shown. The mask 154 has edge 156. Thus, the mask 154 may include an aperture or other feature that exposes a portion of the substrate 152. Through the RIE performed in step 106, a cavity 158 has been formed. The cavity 158 has sidewalls 160 making a cavity angle, θ, with horizontal. The cavity angle θ may be large. For example, the cavity angle θ may be being greater than twenty degrees. In some embodiments, the cavity angle θ is at least fifty degrees and not greater than eighty degrees. The cavity 158 has a depth, d. The cavity 158 may have a depth of at least twenty micro-inches. In some embodiments, the depth is greater than thirty micro-inches. In some such embodiments, the cavity 158 may have a depth that is up to two hundred micro-inches. For cavities 158 of this depth, the sidewalls 160 may make a steep angle θ, described above.

Using the method 100, the cavity 158 may be formed. The taper formed in step 104 allows the RIE performed in step 106 to be self-cleaning. As a result, residue on the sidewalls 156 may be reduced or eliminated. A reduction in the residue may allow the cavity angle θ to be larger and the cavity 158 depth, d, higher. Stated differently, the sidewalls 160 of the cavity 158 may be more vertical, even for a cavity having a depth of up to two hundred micro-inches. Thus a cavity 158 having the desired topology—a steep sidewall 160 and a flat bottom—may be achieved. A more consistent fly height may thus be achieved. In addition, a reduction in or elimination of the residue may reduce oxidation of portions of the magnetic recording head 150. Thus, performance may be improved.

Figure 7:
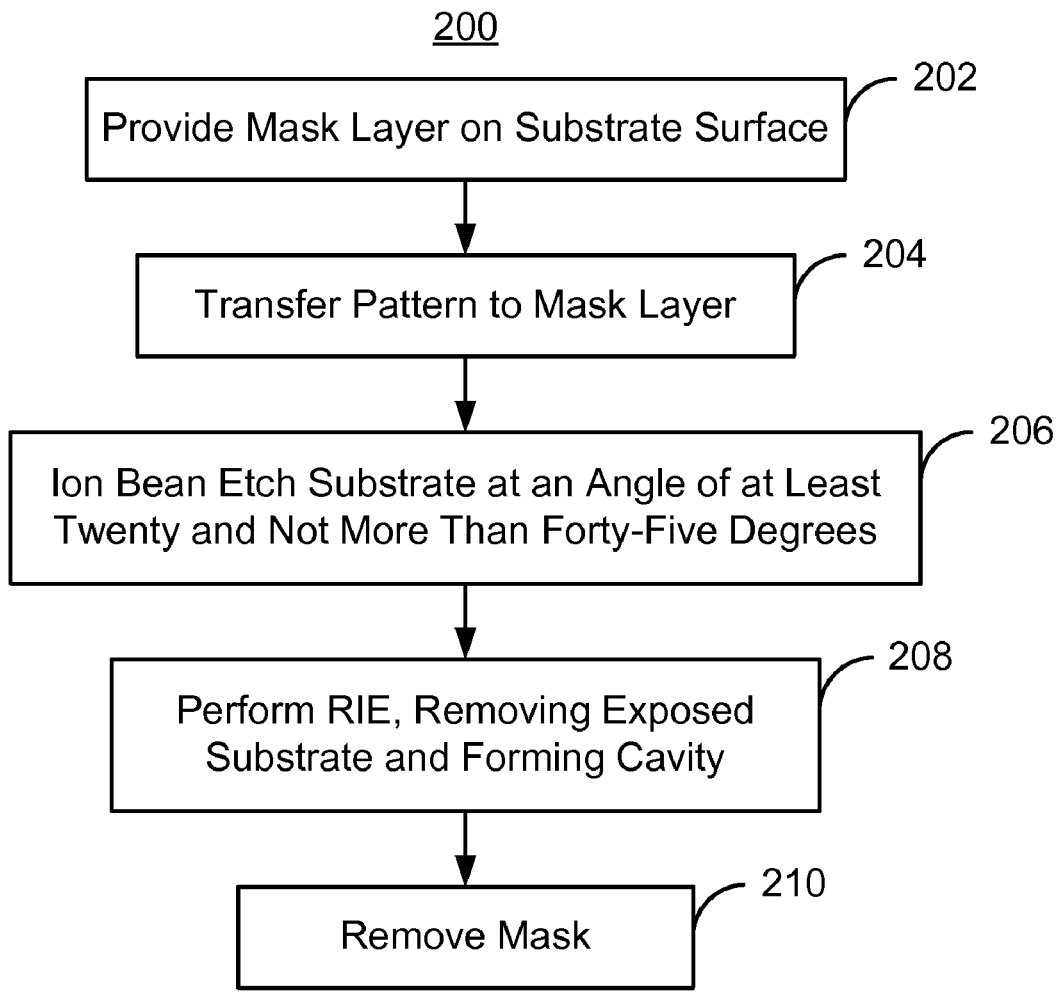
FIG. 7 is a flow chart depicting an exemplary embodiment of a method for fabricating a magnetic recording head.

FIG. 7 is a flow chart depicting an exemplary embodiment of a method 200 for fabricating a magnetic recording head. For simplicity, some steps may be omitted.

FIGS. 8-12 are diagrams depicting an exemplary embodiment of a magnetic recording head 250 during fabrication. For clarity, FIGS. 8-12 are not to scale. For simplicity, some steps of the method 200 may be omitted and/or combined. The method 200 also may commence after formation of other portions of the magnetic recording head. The method 200 is also described in the context of providing a magnetic recording head 250. However, the method 200 may be used to fabricate multiple magnetic recording heads at substantially the same time. The method 200 is used in fabricating the ABS of the magnetic recording head 250. More specifically, the method 200 may be used in forming a cavity for the ABS.

Figure 8:
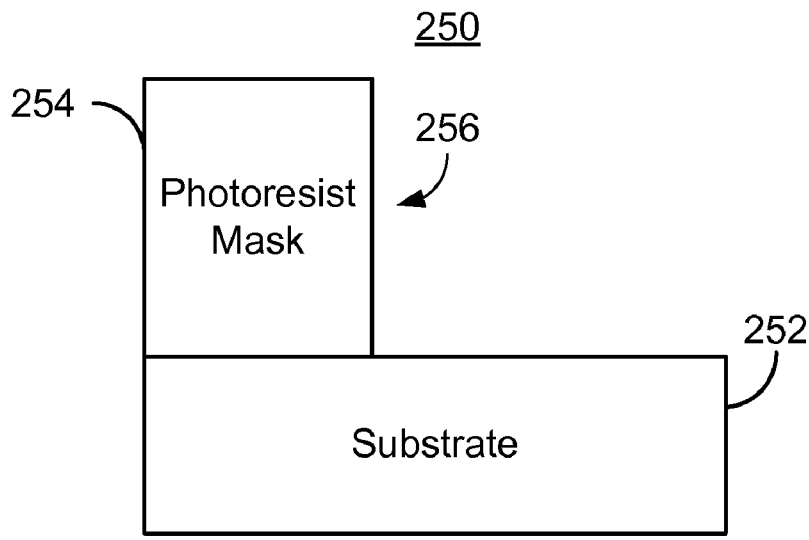
FIGS. 8-12 are diagrams depicting an exemplary embodiment of a magnetic recording head during fabrication.

A mask layer is provided on the surface of the substrate for the magnetic recording head, via step 202. In some embodiments, the substrate is an AlTiC slider. However, in other embodiments, the substrate may be made of another material. For example, a photoresist layer may be deposited in step 202. A pattern is transferred to the mask layer, via step 204. Thus, a mask is formed. In some embodiments, photolithography is used to transfer the pattern in step 204. FIG. 8 depicts a portion of the magnetic recording head 250. For simplicity, read and write transducers are not shown. A substrate 252 and mask 254 are shown. In the embodiment shown, the mask 254 is a photoresist mask. However, in other embodiments, another type of mask may be used. The mask 254 includes edge, or sidewall, 256. Thus, the mask 254 exposes a portion of the substrate 252. In some embodiments, steps 202 and 204 may be used to form a mask.

Figure 9:
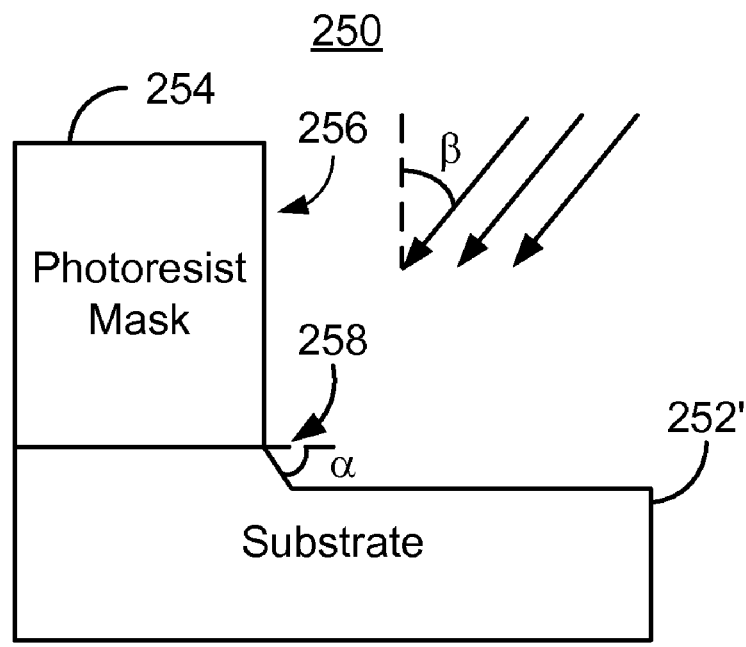

An ion beam etch is performed at an etch angle, via step 206. FIG. 9 depicts the magnetic recording head 250 during step 206. Thus, an ion beam at an etch angle, β, is shown. In some embodiments, this etch angle is at least twenty degrees and not more than forty-five degrees. The ion beam etch forms a taper 258 in the substrate 252'. In the embodiment shown, the taper 258 adjoins the edge 256. The taper forms an angle, α, from the surface of the substrate of at least thirty degrees and not more than seventy degrees. In some embodiments, this taper angle, α, is at least forty-five degrees and not more than sixty degrees.

Figure 10:
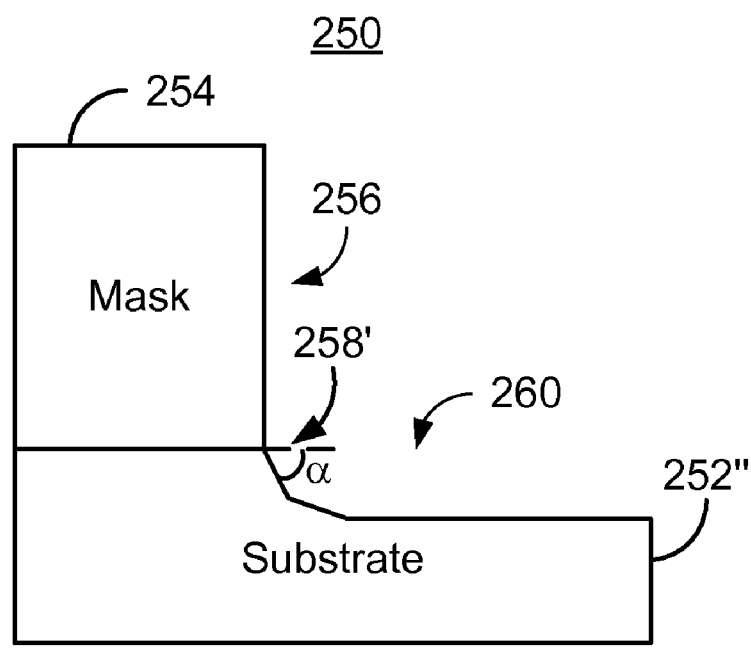
Figure 11:
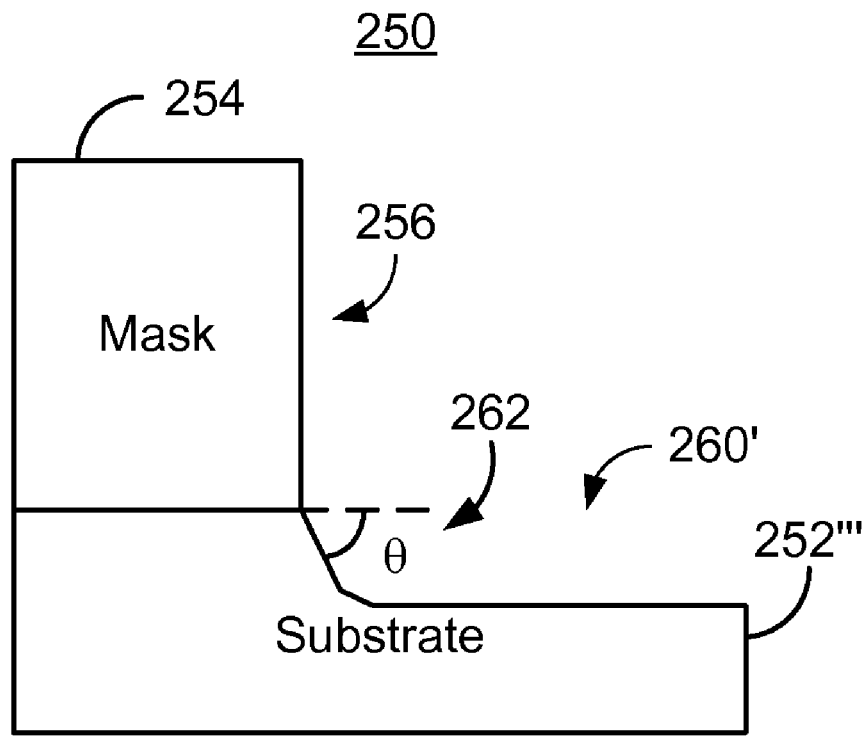

An RIE is performed, via step 208. The RIE may, for example, utilize a chlorine-based plasma or a fluorine-based plasma. The RIE removes the exposed portion of the substrate, adjacent to the edge 256 of the mask 254. FIGS. 10 and 11 depict the magnetic recording head 250 during step 208. As can be seen in FIG. 10, a cavity 260 is started to be formed in the substrate 252". In addition, the taper 258' allows for reduction or elimination of etch residues on the edges 256. Stated differently, the taper may allow for self-cleaning of the sidewalls of the mask. For example, etch products of a chlorine-based chemistry of an AlTiC substrate may include $Al_w Cl_x$ and $Ti_y Cl_z$. Etch products of a fluorine-based chemistry of an AlTiC substrate may include $Al_u F_v$. However, less of such residue accumulates on the edges 256 of the mask 254. The residue that does accumulate on the taper 258' may resputter off of the taper 258'. The angle of the taper 258' formed in step 206 is configured such that redeposition from the RIE on the edge 256 of the mask 254 may be substantially eliminated. FIG. 11 depicts the magnetic recording head 250 after step 208 is completed. The cavity 260' has been formed in the substrate 252". The cavity has sidewalls 262 that form an angle, θ, with the surface of the substrate. The cavity angle θ may be being greater than twenty degrees. In some embodiments, the cavity angle θ is at least fifty degrees and not greater than eighty degrees. The cavity 260' has a depth, d, which may be at least twenty micro-inches. In some embodiments, the depth is greater than thirty micro-inches. In some such embodiments, the cavity 260' may have a depth that is up to two hundred micro-inches. Although the cavity 260' may be deep, the angle, θ, may still be steep.

Figure 12:
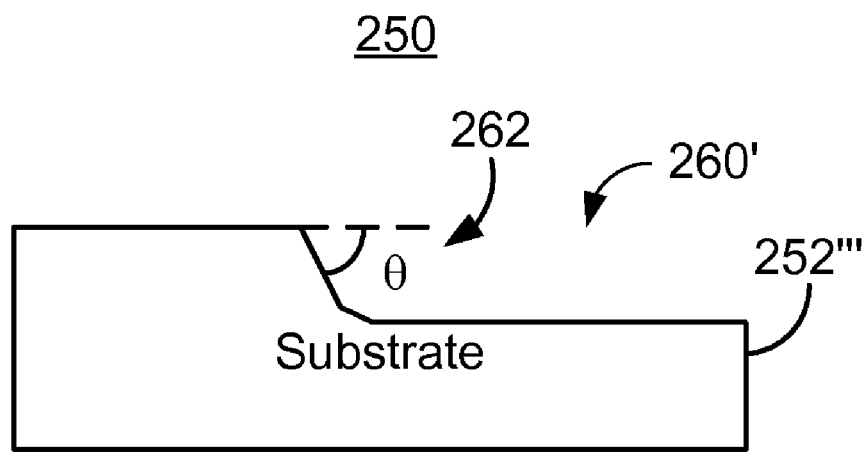

The mask 254 may then be removed, via step 210. For example, the mask 254 may be stripped in step 210 and fabrication of the magnetic recording head continued. FIG. 12 depicts the magnetic recording head 250 after step 210 is completed. Thus, the mask 254 has been removed.

Using the method 200, the cavity 260' may be formed in the substrate 252". As a result, the etch residue from cavity 260' formation may be reduced or eliminated. As a result, the sidewalls 262 of the cavity 260' may be more vertical and the bottom flatter, even for a cavity having a depth of up to two hundred micro-inches. Thus, a more consistent fly height may be achieved. In addition, a reduction in or elimination of the residue may reduce oxidation of portions of the magnetic recording head 250. For example, oxidation of the pole may be reduced or eliminated. Thus, performance may be improved.

We claim:

1. A method for fabricating an air-bearing surface (ABS) in a substrate having a surface, the substrate being for a magnetic recording head, the method comprising:

providing a mask on the surface of substrate, the mask having an edge adjacent to a portion of the substrate exposed by the mask;

forming a taper in the portion of the substrate adjacent to the edge using an ion beam etch at an etch angle from normal to the surface, the taper having an angle from the surface of the substrate of at least thirty degrees and not more than seventy degrees;

performing a reactive ion etching (RIE) to remove the portion of the substrate to form a cavity in the substrate, the angle of the taper being configured to substantially eliminate redeposition from the RIE on the edge.

2. The method of claim 1 wherein the angle is at least forty-five degrees and not more than sixty degrees.

3. The method of claim 1 wherein the etch angle is at least twenty degrees and not more than forty-five degrees.

4. The method of claim 1 wherein the substrate includes AlTiC.

5. The method of claim 1 wherein the substrate includes a ceramic.

6. The method of claim 1 wherein at least the portion of the substrate consists of a single material.

7. The method of claim 1 wherein the step of performing the RIE forms a cavity edge, the cavity edge having a cavity angle with respect to the surface, the cavity angle being greater than twenty degrees.

8. The method of claim 7 wherein the cavity angle is at least fifty degrees and not greater than eighty degrees.

9. The method of claim 1 wherein the step of performing the RIE forms the cavity having a depth of at least twenty micro-inches.

10. The method of claim 9 wherein the depth is not more than two hundred micro-inches.

11. A method for fabricating an air-bearing surface (ABS) in an AlTiC substrate having a surface and being for a magnetic recording head, the method comprising:

providing a mask on the surface of the AlTiC substrate, the mask having an edge adjacent to a portion of the AlTiC substrate, the portion of AlTiC the substrate being exposed by the mask;

ion beam etching the portion of the AlTiC substrate at an etch angle of at least twenty and not more than forty-five degrees to form a taper in the AlTiC substrate adjacent to the edge, the taper having an angle from the surface of the AlTiC substrate of at least forty-five degrees and not more than sixty degrees; performing a reactive ion etching (RIE) to remove the portion of the AlTiC substrate to form a cavity in the AlTiC substrate, the angle of the taper being configured to substantially eliminated redeposition from the RIE on the edge, the cavity having an angle of at least fifty degrees from the surface.

* * * * *